United States Patent [19]
Katuszonek

[11] Patent Number: 5,982,752
[45] Date of Patent: Nov. 9, 1999

[54] METHOD AND APPARATUS FOR DETECTING MULTIPLEXING STANDARD MISMATCHES IN COMMUNICATION NETWORKS

[75] Inventor: Mark A. Katuszonek, Antelope, Calif.

[73] Assignee: MCI Communications Corporation, Washington, D.C.

[21] Appl. No.: 08/845,317

[22] Filed: Apr. 25, 1997

[51] Int. Cl.⁶ ................................. G01R 31/08
[52] U.S. Cl. ............................. 370/242; 379/22
[58] Field of Search ........................ 370/241, 242, 370/243, 244, 246, 252, 248; 379/5, 6, 22, 261, 27, 28, 29

[56] References Cited

U.S. PATENT DOCUMENTS

| | | | |
|---|---|---|---|
| 5,191,595 | 3/1993 | Parsons | 370/243 |
| 5,553,081 | 9/1996 | Downey et al. | 370/252 |
| 5,802,446 | 9/1998 | Giorgi et al. | 370/241 |
| 5,812,756 | 9/1998 | Taylor | 395/183.06 |
| 5,812,786 | 9/1998 | Seazholtz et al. | 395/200.63 |

*Primary Examiner*—Hassan Kizou
*Assistant Examiner*—Daniel Previl

[57] ABSTRACT

A test of digital communications facilities identifies facilities that have AMI/H8ZS line coding mismatches. A test apparatus and method transmits a test tone signal simultaneously on contiguous channels over a trunk to produce a series of consecutive zeros which span the two channels to invoke the B8ZS code. The test apparatus method then compares the sent signal to the received signal to determine whether the received signal deviates from predetermined thresholds. If so, then the currently analyzed channel suffers an AMI/B8ZS mismatch.

28 Claims, 3 Drawing Sheets

METHOD AND APPARATUS FOR DETECTING MULTIPLEXING STANDARD MISMATCHES IN COMMUNICATION NETWORKS

TECHNICAL FIELD

The present invention relates to detecting signaling mismatches in communication channels, such as mismatches between AMI and B8ZS line coding standards in telecommunications networks.

BACKGROUND OF THE INVENTION

In the telecommunications field, particularly in long-distance networks, long-distance network providers continually strive to increase the traffic carrying capacity of their transmission medium. For example, since fiber optic cables have increased bandwidth over known twisted pair or copper wire cables, fiber optic cables are used increasingly for connecting network stations and other network elements. As a result, a greater number of stations or network elements can be connected over a fewer number of fiber optic cables, as opposed to prior cables. In other words, each fiber optic cable can handle numerous trunks, as opposed to prior cables.

Additional channels can be provided over fiber optic or other cables by a digitizing and multiplexing signals transmitted over such cables. For example, a single T1 trunk can carry 24 DS-0 channels. Each of the 24 channels are multiplexed to provide a continuous series of 8 bit bytes for each channel. Voice is digitized or pulse code modulated (PCM) under the known Mu-law standard employed in Japan and North America. Under the Mu-law standard, a PCM encoding algorithm digitizes each sample into 8 bits, thus providing a 64K transmission rate (the standard rate for encoding voices is 8K samples/second). A sample typically consists of a sign bit, a 3 bit segment specifying a national logarithmic range, and a 4 bit step offset into the range. All bits of the sample are typically inverted before transmission.

To properly transmit a digital signal between transmitting and receiving nodes, alternate mark inversion (AMI) is employed. AMI is a line coding format in T-1 or DS-1 transmission systems whereby successive ones ("marks") are alternately inverted (i.e., sent with polarity opposite that of the preceding mark). If long strings of zeros are transmitted, AMI fails to provide adequate synchronization between transmitting and receiving nodes in a network. Therefore, telephony equipment that uses AMI prohibits any string of eight consecutive zeros from being transmitted on a per channel basis.

Typically, every sixth frame transmitted on a T-1 trunk includes signaling information (e.g., information indicating that a given channel is still off hook, etc.). Many telecommunications network providers are striving to provide 64 kilobit "clear channels," so as to provide 100% data transmission for subscribers to the network (e.g., ISDN trunks). Such clear channels provide 64 kilobits per second bandwidth, with no signaling data transmitted, and are thus ideal for high speed data transmissions. Such data transmissions can generate strings of eight zeros.

An improvement to AMI was developed known as binary eight zeros substitution (B8ZS). Under the B8ZS standard, strings of eight zeros are replaced with a special B8ZS byte by a transmitting node. The receiving node, receiving the special B8ZS byte, converts this byte back into a string of eight zeros. Unfortunately, various nodes and equipment within a network employ either the AMI or the B8ZS line coding standard. AMI/B8ZS line encoding mismatches typically affect data and facsimile messages transmitted over a network. Errors range from slightly distorted facsimile messages to totally indecipherable messages.

If such AMI/B8ZS line coding mismatches are detected, equipment can be replaced or modified to convert to one of the two standards (typically to the B8ZS standard). One known method of detecting such line coding mismatches is to perform a signal channel impulse noise test for a period of five minutes. Adjacent channel activity, together with the impulse noise signal, produces a series of zeros, which can be detected by test apparatus. Thus, this method relies on adjacent channel activity (customer voice or data) to detect mismatches. Even if adjacent channel activity is sufficient to immediately produce a channel mismatch with the impulse noise signal, the test is nevertheless extended for a duration of five minutes to ensure that adjacent channel activity will produce a mismatch if such a mismatch exists along a given trunk.

Such prior method of detecting AMI/B8ZS mismatches takes considerable time to complete when a large digital network must be analyzed. Furthermore, even though a mismatch may be detected, a retest is typically performed by a field technician to confirm that such a mismatch exists. Thus, while the initial test may correctly detect a mismatch, the subsequent retest may in fact fail to detect the mismatch. As a result, the mismatch error may go uncorrected. Moreover, detected mismatches may go uncorrected for months if not years, since a field technician must perform such a retest.

Most digital networks have a mixture of AMI/B8ZS nodes. Due to the drawback of the above test, it is difficult, if not impossible, to totally eliminate such line coding mismatch. Furthermore, human error and changes to the network will, over time, increase the likelihood of such mismatches.

SUMMARY OF THE INVENTION

In a broad sense, the present invention embodies the method for use in a network. The network has at least one transmission medium carrying two multiplexed, contiguous digital channels. The method includes the steps of: (a) simultaneously transmitting a test signal over the two contiguous channels of the medium to produce a series of at least eight consecutive values of a first binary state; (b) determining whether at least one of the two channels is acceptable; and (c) declaring an error if at least one of the two channels is unacceptable.

DETAILED DESCRIPTION OF THE INVENTION

Figure 1:
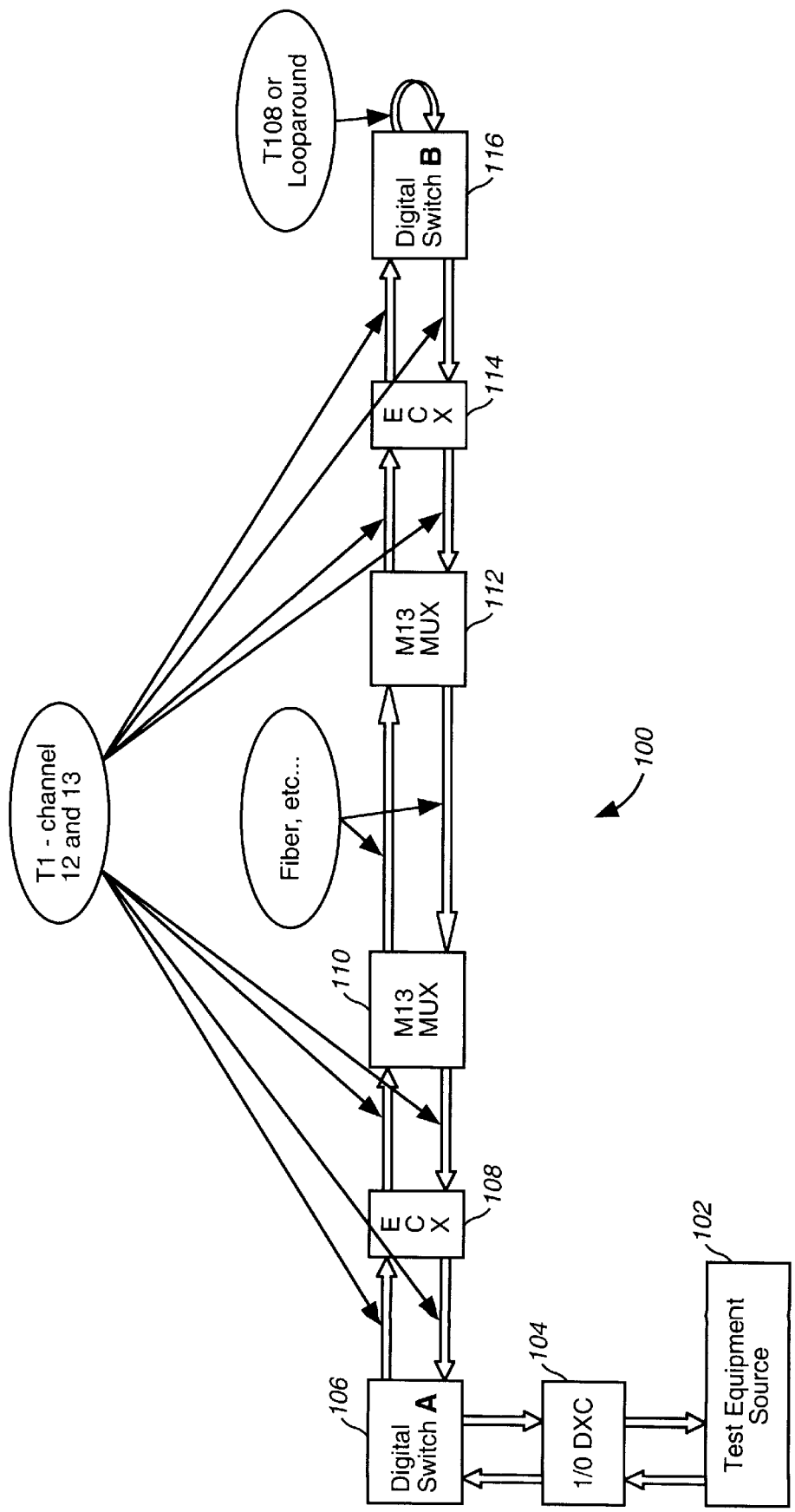
FIG. 1 is a block diagram of a portion of a network embodying and employing an embodiment of the present invention.

Referring to FIG. 1, a portion of a digital telecommunications network 100 is shown as being subjected to a line coding mismatch test under an embodiment of the present invention. While only a portion of the overall network 100 is shown, the embodiment of the present invention can be applied throughout the network. Test source equipment 102, typically including a computer and a tone generator, provides a predetermined test signal such as a conventional impulse noise test signal across two contiguous channels on one trunk. A tone generator can be a piece of test equipment located within the network 100, while the computer is remotely located and which accesses and can control the tone generator. The impulse noise test signal is provided at a selected frequency, such as 1004 Hertz at −13 dBmO (i.e., 13 dB of output power with no input signal).

Under an exemplary embodiment, the impulse noise test is performed using industry standard criteria to determine a mismatch, such as a threshold of 60 dBrnc0, phase hit of 8 degrees and a spread of 4 dB. In other words, if the impulse noise signal transmitted and ultimately received again by the test equipment 102 (as described below) deviates 60 decibels above a reference noise value c0 for a low hit, 64 dB for a medium hit or 68 dB for a high hit, or deviates by greater than 8 degrees phase shift, then the test equipment recognizes a line coding mismatch. The three thresholds provide an indication of how far the received signal deviates from a desired value. While the exemplary embodiment employs the impulse noise test signal, the test equipment 102 can employ another tone or other signal to provide eight consecutive and adjacent zeros across two contiguous channels on one trunk. For example, the test equipment 102 can simultaneously and continuously transmit two predetermined bytes over two contiguous channels to produce a series of at least eight consecutive zeros across the channel boundary.

A digital cross-connect (DXC) 104 receives the impulse noise test from the test equipment 102 over the two contiguous channels and transmits them to a first digital switch 106. The DXC 104 preferably can multiplex and demultiplex DS-1 and DS-0 trunks. The digital switch 106 in turn transmits the impulse noise signal over the two contiguous channels over a selected DS-1 or T-1 trunk.

The selected T-1 trunk extends through a first echo canceler (ECX) 108 and an M13 multiplexer (MUX) 110. A second multiplexer 112 is coupled to the first multiplexer 110 and receives the T-1 trunk via fiber cables or other similar transmission medium, while a second echo canceler 114 receives the T-1 trunk from the second multiplexer 112. A second digital switch 116, coupled to the second echo canceler 114, receives the impulse noise test signal. A conventional T-108 test device or loop around routes the received impulse noise test signal on the first T-1 trunk onto a second, return T-1 trunk. The second T-1 trunk then similarly extends from the second digital switch 116, through the second echo canceler 114 and multiplexer 112, first multiplexer 110 and echo canceler 108, to the first digital switch 106. The first digital switch 106 then routes the received impulse noise test signal back to the test equipment 102 through the DXC 104. Thus, under the exemplary embodiment of the present invention, two T-1 trunks are tested, a first T-1 extending from the first digital switch 106 to the second digital switch 116, and a second T-1 trunk extending in the reverse direction.

Figure 2:
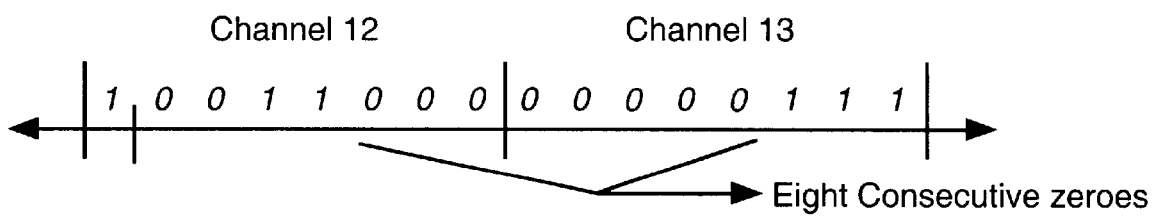
FIG. 2 is a schematic diagram of an exemplary test pattern transmitted over two channels under the embodiment of the present invention.

Referring to FIG. 2, an exemplary test signal is shown for use on a T-1 or other trunk to detect AMI/B8ZS line coding mismatches. A string of eight consecutive zeros must be transmitted on and extend across or between two contiguous channels. As shown in FIG. 2, the three least significant bits of channel 12, and the five most significant bits of channel 13 together form eight consecutive zeros. By transmitting the 1004 hertz tone under the impulse noise test simultaneously on both channels 12 and 13, such a bit pattern having eight consecutive zeros results. Channel 13 receives the most significant corruption from a line coding mismatch such as AMI/B8ZS mismatch since any corruption will effect the most significant bit positions in this channel.

Any two contiguous channels can be used under the embodiment of the present invention. However, channels 1 or 24 in a T-1 trunk are preferably not used because framing alignment could potentially cause corruption. As is known, each frame in a T-1 trunk includes 24 channels having a total of 193 bits, where one bit corresponds to a framing alignment bit. Thus, each channel includes 192 bits/24 channels. The framing alignment bit can cause corruption under the test described herein. Additionally, while the embodiment of the present invention is generally described herein as testing line coding mismatches on T-1 trunks, other bandwidth trunks or channels can likewise be tested.

Figure 3:
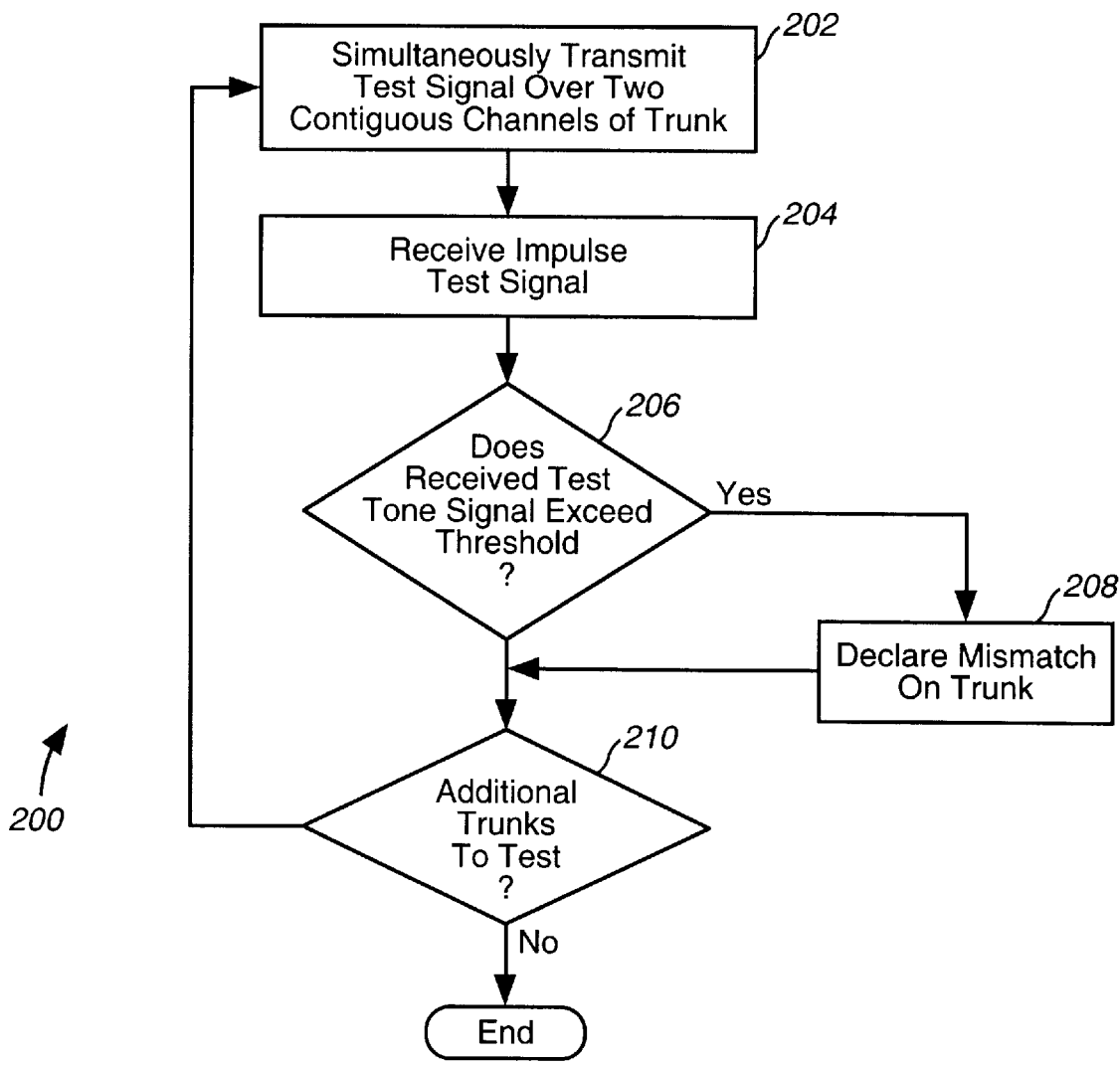
FIG. 3 is an exemplary flow chart diagram of a method for detecting line coding mismatches under the embodiment of the present invention.

Referring to FIG. 3, a routine 200 performed by the test equipment 102 is shown. In an initial step 202, the test equipment 102 simultaneously transmits the test tone signal over two contiguous channels. As explained above, the exemplary embodiment transmits a 1004 hertz tone under an impulse noise test on channels 12 and 13 over a T-1 trunk. The test equipment 102 simultaneously transmits such test tone signal continuously for a short duration, e.g., 30 seconds, over both channels. Note, while the prior method of detecting AMI/B8ZS mismatches required at least five minutes to be completed, the embodiment of the present invention is 10 times quicker since it requires only 30 seconds in duration per trunk. While the exemplary embodiment performs a test of a given trunk for a 30 second duration, a test could be performed during as short a duration as one second, although a longer period of time helps ensure accurate results.

In step 204, the test equipment 102 receives the impulse test tone signal on the two contiguous channels, after passing through the DXC 104, first and second digital switches 106 and 116, echo cancelers 108 and 114, and multiplexers 110 and 112, over the outgoing and incoming T-1 trunks. In step 206, the test equipment 102 determines whether the test tone signal exceeds one or more selected thresholds. Under the exemplary embodiment, the test equipment receives the 1004 hertz impulse noise test signal over channels 12 and 13 and determines whether the signal received on channel 13 exceeds the 60, 64 or 68 dBrnc0 thresholds or has a phase hit of greater than eight degrees. The test equipment 102 compares the test signal transmitted over the trunk to hat which it receives to determine whether the received signal matches the transmitted signal.

For example, if the equipment 104–116 of the portion of the network 100 in FIG. 1 all employed B8ZS line coding, then strings of eight zeros spanning channels 12 and 13 would be appropriately replaced with the predetermined B8ZS code word during transmission, and then replaced with eight zeros before again being received by the test equipment 102. As a result, the test equipment 102 would recognize that the test tone signal suffers from little or no distortion and thus matched the received test tone signal. Therefore, no line coding mismatches existed along the currently-examined trunks.

However, if one or more of the equipment 104–116 employs AMI line coding, then the received test tone signal will be distorted from the signal originally sent. For example, the received tone would exceed the 60, 64, or 68 dBrnc0 thresholds or the 8 degree phase threshold. Each time that the received signal deviates from the transmitted signal, the test equipment 102 registers a mismatch or "hit." If the test equipment 102 determines that more than 200 times the received signal exceeded the thresholds, then the test equipment in step 208 declares a line coding mismatch on the currently-examined trunk.

Alternatively, the test equipment 102 can compare the bytes or bit patterns in the received channels 12 and 13 to the bytes transmitted. If the received bytes differ from the transmitted bytes, then the test equipment 102 registers a hit. Each received byte that deviates from the originally transmitted byte is registered as a hit. While such an alternative comparison is more accurate than the previously described embodiment, analysis of tones in a telecommunications network is well known, and thus noisy or distorted tones can be readily detected and compared to thresholds.

In step 210, the test equipment 102 determines whether additional trunks in the network are to be tested. If so, the test equipment 102 again performs the steps 202 through 210 to test all trunks within the network. Thereafter, the routine 200 ends. If the network 100 contains any line coding mismatches, then a technician can isolate the mismatch, and correct the mismatch using conventional techniques.

The test equipment 102, under the routine 200, tests for AMI/B8ZS mismatches along the outgoing and incoming T-1 trunks, extending through the DXC 104, digital switches 106 and 116, echo cancelers 108 and 114 and multiplexers 110 and 112. Although not shown, the T-1 trunks may pass through other nodes within the telecommunications network, thereby also testing such equipment for line coding mismatches.

An alternate approach to detecting line coding mismatches tests certain trunks such as DS-1 trunks. Under such DS-1 line testing, line coding mismatches between the multiplexers 110 and 112 are only detected. Therefore, a mismatch between, for example, the first digital switch 106 and the multiplexer 110 will not be detected. Additionally, such DS-1 line testing requires that the DS-1 trunk be taken out of service, thereby reducing traffic-carrying capacity of the network. Furthermore, two technicians are required to perform such test, and thus the test is slow and costly.

In yet another alternative method, 64 kilobit lines or "clear channels" can be tested for AMI/B8ZS mismatches. However, current testing of switched telephone networks is limited in capacity because it cannot perform 64 kb testing. This is primarily because equipment within digital networks today do not support 64 kb patterns, such as echo cancelers. Also, a majority of switched ports used in digital switches do not support such testing.

Although specific embodiments of, and examples for, the present invention are described herein for illustrative purposes, various equivalent modifications can be made without departing from the spirit and scope of the invention, as will be recognized by those skilled in the relevant art. The teaching provided herein of embodiments of the present invention can be applied to other communications or network systems, not necessarily the exemplary telecommunications system described above.

While certain operations under the present invention have been described as occurring generally in a serial fashion, those skilled in the relevant art will recognize that it is within the scope of the invention to conduct some operations more or less simultaneously, or even in alternate order, from that described herein. These and other changes can be made to the embodiments of the invention in light of the above-detailed description. In general, in the following claims, the terms used should not be construed to limit the invention to the specific embodiments disclosed in the specification and the claims, but should be construed to include any network test system that operates under the claims. Accordingly, the invention is not limited by the disclosure, but instead its scope is to be determined entirely by the following claims.

I claim:

1. In a telecommunication network having at least one trunk carrying two multiplexed, contiguous digital channels, wherein the trunk extends between two nodes, a method comprising the steps of:

simultaneously transmitting a test signal over the two contiguous channels of the trunk to produce a series of at least eight consecutive binary zeros spanning across the two contiguous channels;

receiving the two channels, determining whether at least one of the two channels is unacceptable; and declaring a line coding mismatch if the at least one of the two channels is unacceptable.

2. The method of claim 1 wherein the step of simultaneously transmitting includes the step of simultaneously transmitting the test signal over any two contiguous channels, except channels 1 or 24, on a T-1 trunk.

3. The method of claim 1 wherein the step of simultaneously transmitting includes the step of simultaneously transmitting an impulse noise test signal of 1004 hertz over the two contiguous channels.

4. The method of claim 1 wherein the step of determining includes the step of determining whether a received signal on one of the two channels exceeds at least one threshold a selected number of times.

5. The method of claim 1 wherein the step of declaring includes the step of declaring an AMI/B8ZS line coding mismatch if the at least one of the two channels is unacceptable.

6. The method of claim 1 wherein the step of simultaneously transmitting includes the steps of simultaneously transmitting a test tone over the two contiguous channels continuously for a period greater than 1 second.

7. In a network having at least one transmission medium carrying two multiplexed, contiguous digital channels, a method comprising the steps of:

simultaneously transmitting a test signal over the two contiguous channels of the medium to produce a series of at least eight consecutive values of a first binary state;

determining whether at least one of the two channels is unacceptable; and declaring an error if the at least one of the two channels is unacceptable.

8. The method of claim 7 wherein the medium is a T-1 trunk, and wherein the step of simultaneously transmitting includes the step of simultaneously transmitting the test signal over any two contiguous channels, except channels 1 or 24, on the T-1 trunk.

9. The method of claim 7 wherein the step of simultaneously transmitting includes the step of simultaneously transmitting an impulse noise test signal of 1004 hertz over the two contiguous channels.

10. The method of claim 7 wherein the step of determining includes the step of determining whether a received signal on one of the two channels exceeds at least one threshold a selected number of times.

11. The method of claim 7 wherein the step of declaring includes the step of declaring an AMI/B8ZS line coding mismatch if the at least one of the two channels is unacceptable.

12. The method of claim 7 wherein the step of simultaneously transmitting includes the steps of simultaneously transmitting a test tone over the two contiguous channels continuously for a period greater than 1 second.

13. The method of claim 7 wherein the step of simultaneously transmitting includes the step of simultaneously transmitting a test tone signal to produce a series of at least eight consecutive binary zero values across the two channels.

14. The method of claim 7 wherein the step of determining includes the step of comparing the simultaneously transmitted signal over at least one channel to a received signal from the at least one channel.

15. A computer-readable medium containing instructions for a computer in a communication system, wherein the communication system includes at least one transmission medium carrying two multiplexed, contiguous digital channels, the instructions of the computer-readable medium comprising the steps of:

simultaneously transmitting a test signal over the two contiguous channels of the medium to produce a series of at least eight consecutive values of a first binary state;

determining whether at least one of the two channels is unacceptable; and declaring an error if the at least one of the two channels is unacceptable.

16. The computer-readable medium of claim 15 wherein the medium is a T-1 trunk, and wherein the step of simultaneously transmitting includes the step of simultaneously transmitting the test signal over any two contiguous channels, except channels 1 or 24, on the T-1 trunk.

17. The computer-readable medium of claim 15 wherein the step of simultaneously transmitting includes the step of simultaneously transmitting an impulse noise test signal of 1004 hertz over the two contiguous channels.

18. The computer-readable medium of claim 15 wherein the step of determining includes the step of determining whether a received signal on one of the two channels exceeds at least one threshold a selected number of times.

19. The computer-readable medium of claim 15 wherein the step of declaring includes the step of declaring an AMI/B8ZS line coding mismatch if the at least one of the two channels is unacceptable.

20. The computer-readable medium of claim 15 wherein the step of simultaneously transmitting includes the steps of simultaneously transmitting a test tone over the two contiguous channels continuously for a period greater than 1 second.

21. The computer-readable medium of claim 15 wherein the step of simultaneously transmitting includes the step of simultaneously transmitting a test tone signal to produce a series of at least eight consecutive binary zero values across the two channels.

22. The computer-readable medium of claim 15 wherein the step of determining includes the step of comparing the simultaneously transmitted signal over at least one channel to a received signal from the at least one channel.

23. In a telecommunications network having at least one transmission medium carrying two multiplexed, contiguous digital channels, an apparatus comprising:

a test signal generator coupled to the medium for simultaneously generating and transmitting a test signal over the two contiguous channels of the medium to produce a series of at least eight consecutive values of a first binary state; and a computer coupled to receive the medium to receive at least one of the two channels, wherein the computer determines whether at least one of the two channels is unacceptable, and declares an error if the at least one of the two channels is unacceptable.

24. The apparatus of claim 23 wherein the medium is a T-1 trunk, and wherein the signal generator simultaneously transmits the test signal over any two contiguous channels, except channels 1 or 24, on the T-1 trunk.

25. The apparatus of claim 23 wherein the signal generator transmits an impulse noise test signal of 1004 hertz over the two contiguous channels.

26. The apparatus of claim 23 wherein the computer determines whether a received signal on one of the two channels exceeds at least one threshold a selected number of times.

27. The apparatus of claim 23 wherein the computer declares an AMI/B8ZS line coding mismatch if the at least one of the two channels is unacceptable.

28. The apparatus of claim 23 wherein the computer compares the simultaneously transmitted signal over at least one channel to a received signal from the at least one channel.

* * * * *

UNITED STATES PATENT AND TRADEMARK OFFICE
CERTIFICATE OF CORRECTION

PATENT NO. : 5,982,752
DATED : November 9, 1999
INVENTOR(S) : Mark A. Katuszonek It is certified that error appears in the above-identified patent and that said Letters Patent is hereby corrected as shown below:

On the title page item [57],

-- Abstract, line 2: "AMI/H8ZS" should read --AMI/B8ZS--.

Signed and Sealed this

Nineteenth Day of December, 2000

Attest:

Q. TODD DICKINSON

*Attesting Officer*      *Commissioner of Patents and Trademarks*